(12) United States Patent
Yoshida

(10) Patent No.: US 12,541,339 B2
(45) Date of Patent: Feb. 3, 2026

(54) SPEAKER SYSTEM, SOUND BAR, WIRELESS SPEAKER, AND METHOD FOR CONTROLLING SPEAKER SYSTEM

(71) Applicant: D&M Holdings, Inc., Kanagawa (JP)

(72) Inventor: Yukihiro Yoshida, Fukushima (JP)

(73) Assignee: D&M HOLDINGS INC., Kanagawa (JP)

( * ) Notice: Subject to any disclaimer, the term of this patent is extended or adjusted under 35 U.S.C. 154(b) by 147 days.

(21) Appl. No.: 18/691,290

(22) PCT Filed: Mar. 22, 2022

(86) PCT No.: PCT/JP2022/013033
§ 371 (c)(1),
(2) Date: Mar. 12, 2024

(87) PCT Pub. No.: WO2023/037625
PCT Pub. Date: Mar. 16, 2023

(65) Prior Publication Data
US 2024/0378013 A1    Nov. 14, 2024

(30) Foreign Application Priority Data

Sep. 13, 2021 (JP) .................................. 2021-148887

(51) Int. Cl.
*G06F 3/16* (2006.01)
(52) U.S. Cl.
CPC .................................. *G06F 3/165* (2013.01)
(58) Field of Classification Search
CPC ....................................................... G06F 3/165
USPC ......................................................... 381/182
See application file for complete search history.

(56) References Cited

U.S. PATENT DOCUMENTS

| 7,987,294 B2 | 7/2011 | Bryce et al. |
| 8,423,893 B2 * | 4/2013 | Ramsay ................. H04R 27/00 |
| | | 715/835 |
| 9,924,291 B2 | 3/2018 | Milne et al. |
| 2007/0005783 A1 * | 1/2007 | Saint-Hillaire ....... H04L 67/025 |
| | | 710/33 |

(Continued)

FOREIGN PATENT DOCUMENTS

JP        2007053507 A    3/2007

*Primary Examiner* — William J Deane, Jr.
(74) *Attorney, Agent, or Firm* — Nieves IP Law Group, LLC; Peter A. Nieves

(57) ABSTRACT

[Problem] To enable a sound bar and a wireless speaker to be grouped and ungrouped through a simple operation. [Solution] When a user moves a controller 3 closer to a sound bar 1, the sound bar 1 reads tag information from an RFID tag 30 of the controller 3 by using an RFID tag reader 10, detects that the user has performed an operation to move the controller 3 closer to the sound bar 1, and checks a host group state. When group formation is in progress, an ungroup notification is transmitted to a wireless speaker 2, which is a participating member of the group, to ungroup the group, and information relating to a slave of the ungrouped group is stored as immediately preceding slave information. However, when ungrouping is in progress, a group formation notification is transmitted to the wireless speaker 2 identified by the immediately preceding slave information to form a group with the wireless speaker 2.

8 Claims, 11 Drawing Sheets

(56) References Cited

U.S. PATENT DOCUMENTS

2022/0303683 A1   9/2022  Ishida
2024/0357290 A1*  10/2024 Lee ........................... H04L 1/16
2025/0240585 A1*  7/2025  Peters .............. H04N 21/44227

* cited by examiner

SPEAKER SYSTEM, SOUND BAR, WIRELESS SPEAKER, AND METHOD FOR CONTROLLING SPEAKER SYSTEM

CROSS-REFERENCE TO RELATED APPLICATIONS

This application is the national stage application of and claims the benefit of International Application No. PCT/JP2022/013033, filed Mar. 22, 2022, entitled SPEAKER SYSTEM, SOUND BAR, WIRELESS SPEAKER, AND METHOD FOR CONTROLLING SPEAKER SYSTEM which claims the benefit of Japanese Patent Application serial number 2021-148887, filed Mar. 13, 2021, both of which are incorporated by reference herein in their entirety.

TECHNICAL FIELD

The present invention relates to a sound bar and to a technology of grouping wireless speakers.

BACKGROUND ART

There has been known a grouping technology for reproducing audio data by group playback with use of a plurality of speakers. For example, a wireless audio system as described in Patent Literature 1 designates one of a plurality of wireless speakers belonging to the same group as a master (group leader). The master downloads audio data from a media server or the like, reproduces and outputs the audio data, and transmits the reproduced data to other wireless speakers (slaves) belonging to the same group as the group of the master to have the other wireless speakers output the reproduced data as well. In this manner, audio data can be reproduced by group playback with the use of a plurality of wireless speakers belonging to the same group.

In addition, a sound bar has become widespread in recent years. A sound bar is a speaker system configured to accommodate speakers of a plurality of channels in the same housing. Compared to installing a speaker for each channel individually, installation space efficiency is better and the installation work is easier. Therefore, through use of a sound bar, a surround sound audio reproduction environment can be easily achieved even in an ordinary home with limited space (for example, Patent Literature 2).

CITATION LIST

Patent Literature

[PTL 1] U.S. Pat. No. 7,987,294 B2
[PTL 2] JP 2009-55450 A

SUMMARY OF INVENTION

Technical Problem

As described above, a sound bar is a speaker system configured to accommodate speakers of a plurality of channels in the same housing, and a surround sound audio playback environment can be achieved with a sound bar alone. However, a surround sound audio playback environment of a higher quality can be achieved by grouping a sound bar and a wireless speaker with a grouping technology and reproducing audio data by group playback.

Incidentally, in a case in which a wireless speaker grouped with a sound bar is to be moved from a room in which the sound bar is installed to another room and used alone, it is required to remove the wireless speaker from the group. However, the existing grouping technologies do not assume frequent repetition of addition to and removal from a group, and a user is required to set settings for addition to and removal from a group each time addition to and removal from a group is repeated, which is cumbersome.

The present invention has been made in view of the circumstance described above, and it is accordingly an object of the present invention to enable grouping of a sound bar and a wireless speaker and disbanding of the group by simple operation.

Solution to Problem

In order to solve the problem described above, in a first aspect of the present invention, a controller which is a wireless terminal or the like is provided with a radio frequency identification (RFID) tag on which tag information including identification information of the controller is stored, and an RFID tag reader is provided in a sound bar. When a user brings the controller close to the sound bar, the sound bar reads the tag information out of the RFID tag of the controller with the RFID tag reader, detects that the user has performed operation of bringing the controller close to the sound bar, and checks its own group state.

In a case in which the sound bar has formed a group prior to that time, the sound bar transmits a group disbanding notification to a wireless speaker belonging to this group, disbands the group, and stores information about the member of the disbanded group as immediate last slave information. In this case, audio content played back last may be downloaded from a media server to be played back by the sound bar alone.

In a case in which the sound bar has not formed a group prior to that time, on the other hand, the sound bar transmits a group forming notification to a wireless speaker identified by the immediate last slave information that has been stored, and forms a group again with the wireless speaker. In this case, audio content played back last may be downloaded from a media server to be played back by group playback.

For example, according to the first aspect of the present invention, there is provided a speaker system including: a sound bar having a group playback function as a master; a wireless speaker having a group playback function as a slave; and a controller, wherein the controller includes a radio frequency identification (RFID) tag on which tag information including identification information of the controller is stored, wherein the sound bar includes: an RFID tag reader configured to read the tag information out of the RFID tag brought close so as to reach a communication range; and master control means configured to: transmit, in a case in which the tag information read by the RFID tag reader includes the identification information of the controller and the sound bar has formed a group, a group disbanding notification to the wireless speaker that is a slave belonging to the group, disband the group, and store information about the slave belonging to the group as immediate last slave information; and transmit, in a case in which the tag information read by the RFID tag reader includes the identification information of the controller and the sound bar has not formed a group, a group forming notification to the wireless speaker identified by the immediate last slave information, and form a group with the wireless speaker, and wherein the wireless speaker includes slave control means configured to: leave a group which the wireless speaker has joined in a case in which the group disbanding notification is received from the sound bar that is a master of the group during a period in which the wireless speaker remains joined to the group; and join a group having the sound bar as a master in a case in which the group forming notification is received from the sound bar during a period in which the wireless speaker remains free of any group since leaving a group.

Further, in a second aspect of the present invention, a controller which is a wireless terminal or the like is provided with an RFID tag on which tag information including identification information of the controller is stored, and an RFID tag reader is provided in a wireless speaker. When a user brings the controller close to the wireless speaker, the wireless speaker reads the tag information out of the RFID tag of the controller with the RFID tag reader, detects that the user has performed operation of bringing the controller close to the wireless speaker, and checks its own group state.

In a case in which the wireless speaker has joined a group prior to that time, the wireless speaker transmits a group leaving request to a sound bar that is a master of the group, leaves the group, and stores information about the master of the group which the wireless speaker has just left as immediate last master information. In this case, audio content played back last may be downloaded from a media server to be played back by the wireless speaker alone.

In a case in which the wireless speaker has left a group prior to that time, on the other hand, the wireless speaker transmits a group joining request to a sound bar identified by the immediate last master information that has been stored, and joins a group having this sound bar as a master. In this case, a group playback request for audio content played back last may be transmitted to the sound bar to play back the audio content by group playback.

For example, according to the second aspect of the present invention, there is provided a speaker system including: a sound bar having a group playback function as a master; a wireless speaker having a group playback function as a slave; and a controller, wherein the controller includes a radio frequency identification (RFID) tag on which tag information including identification information of the controller is stored, wherein the wireless speaker includes: an RFID tag reader configured to read the tag information out of the RFID tag brought close so as to reach a communication range; and slave control means configured to: transmit, in a case in which the tag information read by the RFID tag reader includes the identification information of the controller and its own wireless speaker has joined a group, a group leaving request to the sound bar that is a master of the group, leave the group, and store information about the master of the group as immediate last master information; and transmit, in a case in which the tag information read by the RFID tag reader includes the identification information of the controller and its own wireless speaker has left a group, a group joining request to the sound bar that is identified by the immediate last master information, and join a group having the sound bar as a master, and wherein the sound bar includes master control means configured to: remove, when the group leaving request is received from the wireless speaker, the wireless speaker from a group having its own sound bar as a master; and add, when the group joining request is received from the wireless speaker, the wireless speaker as a slave to a group having its own sound bar as a master.

Advantageous Effects of Invention

In the first aspect of the present invention, with the user's operation of bringing the controller close to a sound bar, a group having this sound bar as a master and a wireless speaker as a slave can be disbanded or formed. In the second aspect of the present invention, with the user's operation of bringing the controller close to a wireless speaker, this wireless speaker can be removed from or added to a group having a sound bar as a master. According to the present invention, grouping of the sound bar and the wireless speaker and disbanding of the group are thus executable by simple operation.

DESCRIPTION OF EMBODIMENTS

One embodiment of the present invention is described below with reference to the drawings.

Figure 1:
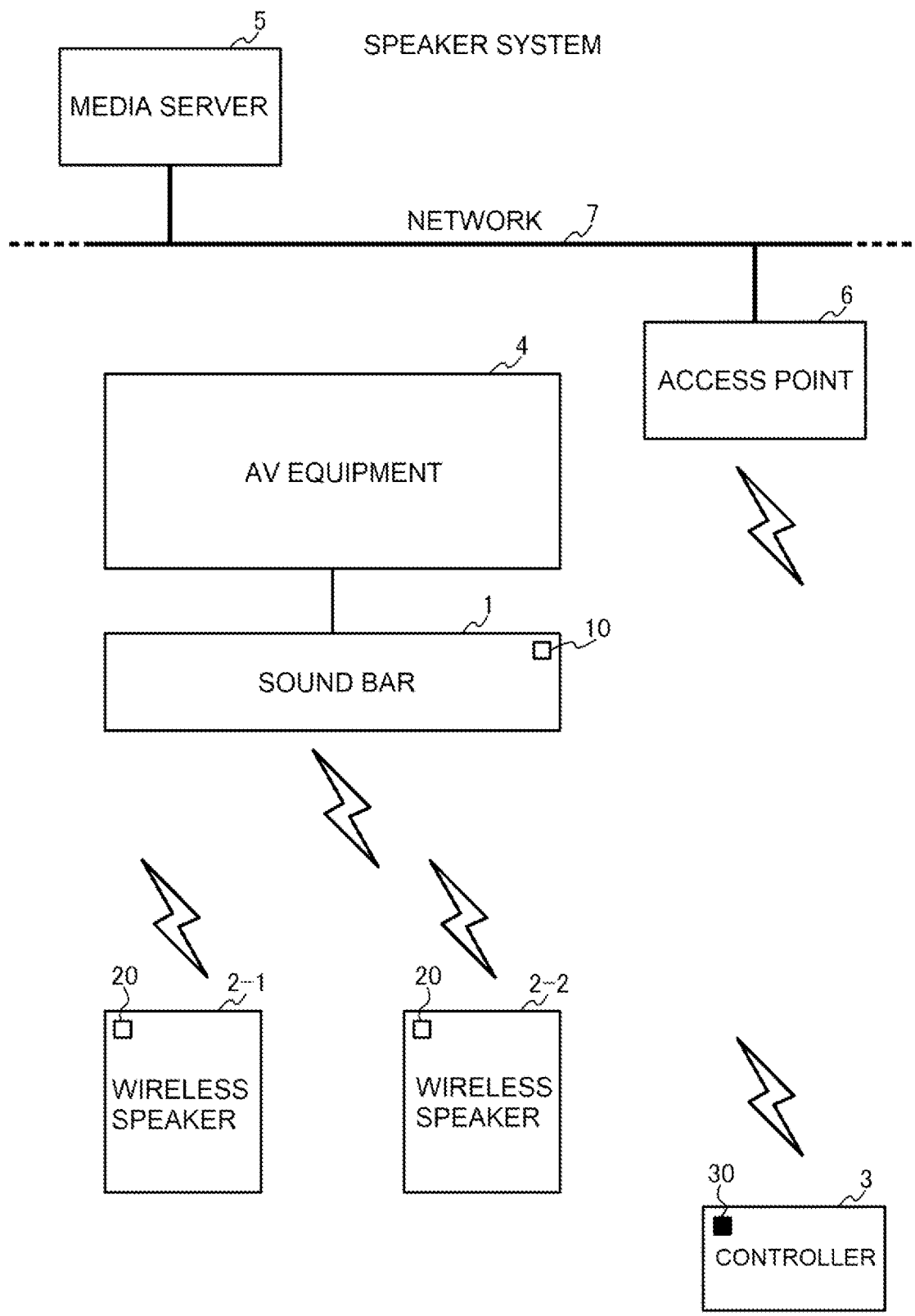
FIG. 1 is a schematic configuration diagram of a speaker system according to one embodiment of the present invention.

FIG. 1 is a schematic configuration diagram of a speaker system according to this embodiment.

As illustrated in the figure, the speaker system according to this embodiment includes a sound bar 1 connected to audio visual (AV) equipment 4, which is a television receiver or the like, by a communication interface such as a High-Definition Multimedia Interface (HDMI, trademark) or a Universal Serial Bus (USB), one or more wireless speakers 2-1 and 2-2 (hereinafter may simply be referred to as "wireless speakers 2"), and a controller 3 for remotely controlling the sound bar 1 and the wireless speakers 2.

The sound bar 1 and the wireless speakers 2 are connected to a media server 5 via an access point 6 and via a network 7 such as a wide area network (WAN) or a local area network (LAN). The sound bar 1, the wireless speakers 2, and the controller 3 are connected to one another by short-range wireless communication such as Bluetooth (trademark).

The sound bar 1 is a speaker system configured to accommodate a plurality of channels including a center channel speaker, a left channel speaker, and a right channel speaker in the same housing, and a surround sound audio playback environment can be achieved by the sound bar 1 alone. That is, the sound bar 1 reproduces audio data acquired from the media server 5, or audio data received from the AV equipment 4, and outputs the audio data from the speakers of the plurality of channels included in the sound bar 1 itself. The sound bar 1 also has a group playback function as a master and, when forming a group with the wireless speakers 2, reproduces audio data acquired from the media server 5, or audio data received from the AV equipment 4, by group playback together with the wireless speakers 2. That is, at the same time as reproducing the audio data and outputting the reproduced data from the speakers of the plurality of channels included in the sound bar 1 itself, the sound bar 1 transmits the reproduced data to the wireless speakers 2 by short-range wireless communication and has the wireless speakers 2 output the reproduced data. In this manner, a surround sound audio playback environment of a higher quality can be achieved.

The sound bar 1 also includes a radio frequency identification (RFID) tag reader 10.

The wireless speakers 2 reproduce and output audio data acquired from the media server 5. The wireless speakers 2 have a group playback function as slaves and, when forming a group with the sound bar 1, receive reproduced data of audio data from the sound bar 1 and output the reproduced data, to thereby reproduce the audio data by group playback together with the sound bar 1.

The wireless speakers 2 each also include an RFID tag reader 20.

The controller 3 is, for example, a wireless terminal such as a smartphone or a tablet personal computer (PC), and includes an RFID tag 30 on which tag information including a controller ID, which is identification information of the controller 3 itself, is stored.

In the speaker system configured as described above, a user performs an action of bringing the controller 3 close to the sound bar 1 or to one of the wireless speakers 2, such as touch operation in which the user touches the sound bar 1 or one of the wireless speakers 2 with the controller 3, to have the RFID tag reader 10 of the sound bar 1 or the RFID tag reader 20 of the wireless speaker 2 read the tag information stored on the RFID tag 30 of the controller 3, and grouping of the sound bar 1 and the wireless speaker 2 as well as disbanding of the group can thereby be executed with ease.

Figure 2:
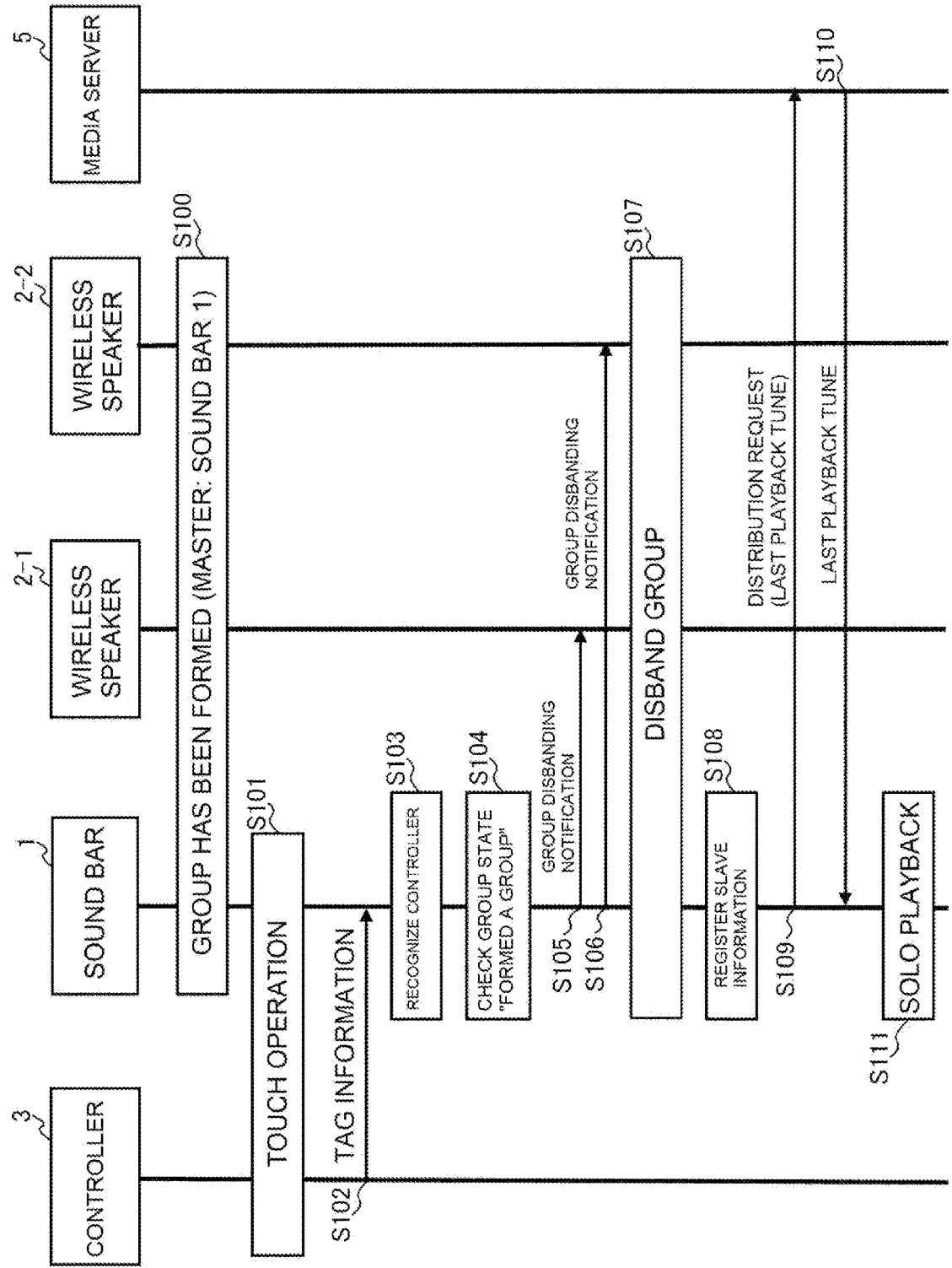
FIG. 2 is a sequence diagram for illustrating group forming and disbanding processing by a sound bar (1) in the speaker system according to the one embodiment of the present invention.
Figure 3:
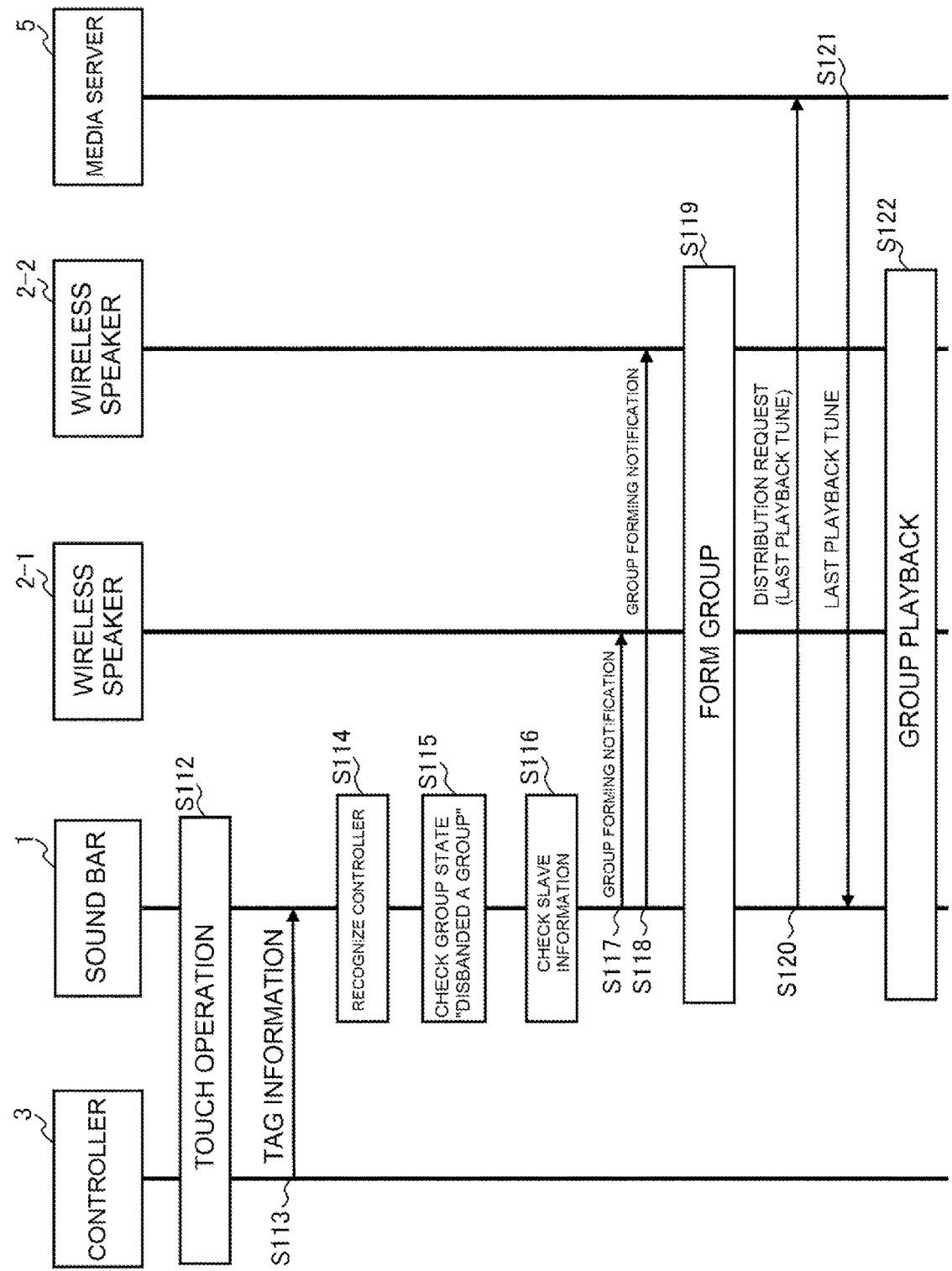
FIG. 3 is a sequence diagram for illustrating the group forming and disbanding processing by the sound bar (1) in the speaker system according to the one embodiment of the present invention, and is a continuation of FIG. 2.

FIG. 2 and FIG. 3 are sequence diagrams for illustrating group forming and disbanding processing by the sound bar 1 in the speaker system according to this embodiment.

It is assumed that a group having the sound bar 1 as a master and having the wireless speakers 2-1 and 2-2 as slaves has been formed (Step S100). The user performs touch operation in which the sound bar 1 is touched with the controller 3 (Step S101). This brings the RFID tag 30 of the controller 3 into a communication range of the RFID tag reader 10 of the sound bar 1, and the RFID tag reader 10 of the sound bar 1 reads the tag information out of the RFID tag 30 of the controller 3 (Step S102).

The sound bar 1 recognizes the fact that the touch operation has been performed with the controller 3, based on the controller ID that is included in the tag information read by the RFID tag reader 10 (Step S103), and then checks the group state "formed a group" of the sound bar 1 itself (Step S104). In this case, the sound bar 1 transmits a group disbanding notification to each of the wireless speakers 2-1 and 2-2 which have joined the group having the sound bar 1 itself as a master (Step S105 and Step S106), and disbands the group (Step S107). The sound bar 1 then registers information of the wireless speakers 2-1 and 2-2 which have been participating members of the disbanded group as immediate last slave information (Step S108).

The sound bar 1 next transmits, to the media server 5 via the access point 6 and the network 7, a distribution request accompanied by specification of a tune played back last (referred to as "last playback tune") by the sound bar 1 itself (Step S109), and acquires the last playback tune from the media server 5 (Step S110). The sound bar 1 then plays back the acquired last playback tune by itself (Step S111). That is, the sound bar 1 plays back the last playback tune and outputs from the speakers of the plurality of channels included in the sound bar 1 itself.

After the last playback tune finishes being played back and some time passes, the user again performs touch operation in which the sound bar 1 is touched with the controller 3 (Step S112). This brings the RFID tag 30 of the controller 3 into the communication range of the RFID tag reader 10 of the sound bar 1, and the RFID tag reader 10 of the sound bar 1 reads the tag information out of the RFID tag 30 of the controller 3 (Step S113).

The sound bar 1 recognizes the fact that the touch operation has been performed with the controller 3, based on the controller ID that is included in the tag information read by the RFID tag reader 10 (Step S114), and then checks the group state "disbanded a group" of the sound bar 1 itself (Step S115). In this case, the sound bar 1 checks the immediate last slave information, transmits a group forming notification by short-range wireless communication to each of the wireless speakers 2-1 and 2-2 which have been participating members of a group formed before the current group state (Step S116, S117 and Step S118), and forms a group having the sound bar 1 as a master and having the wireless speakers 2-1 and 2-2 as slaves (Step S119).

The sound bar 1 next transmits, to the media server 5 via the access point 6 and the network 7, a distribution request accompanied by specification of the last playback tune (Step S120), and acquires the last playback tune from the media server 5 (Step S121). The sound bar 1 then plays back the acquired last playback tune by group playback (Step S122). That is, at the same time as playing back the last playback tune and outputting the played back tune from the speakers of the plurality of channels included in the sound bar 1 itself, the sound bar 1 transmits reproduced data of this last playback tune to the wireless speakers 2-1 and 2-2 by short-range wireless communication and has the wireless speakers 2-1 and 2-2 output the reproduced data.

Figure 4:
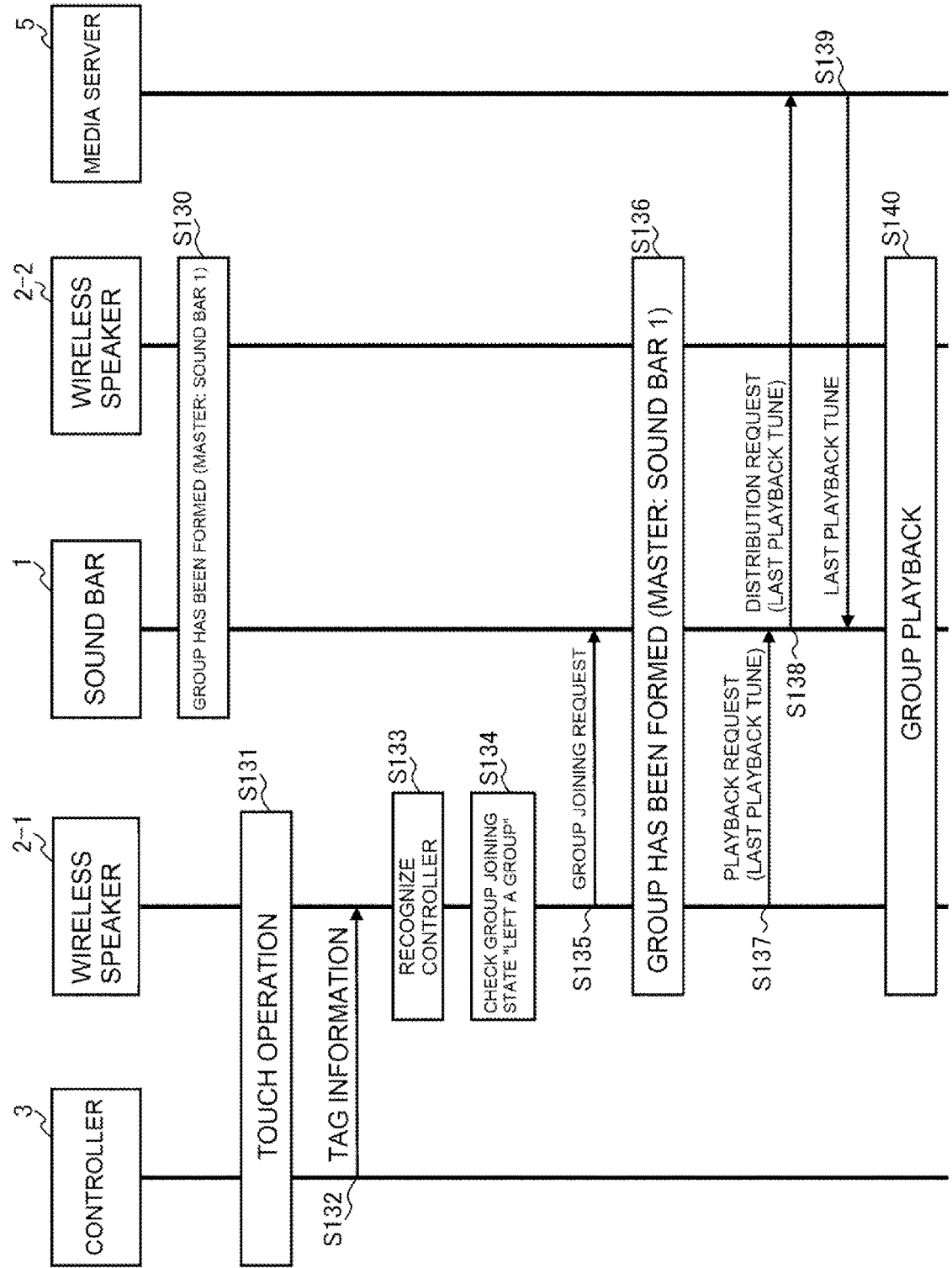
FIG. 4 is a sequence diagram for illustrating group joining and leaving processing by wireless speakers (2) in the speaker system according to this embodiment.
Figure 5:
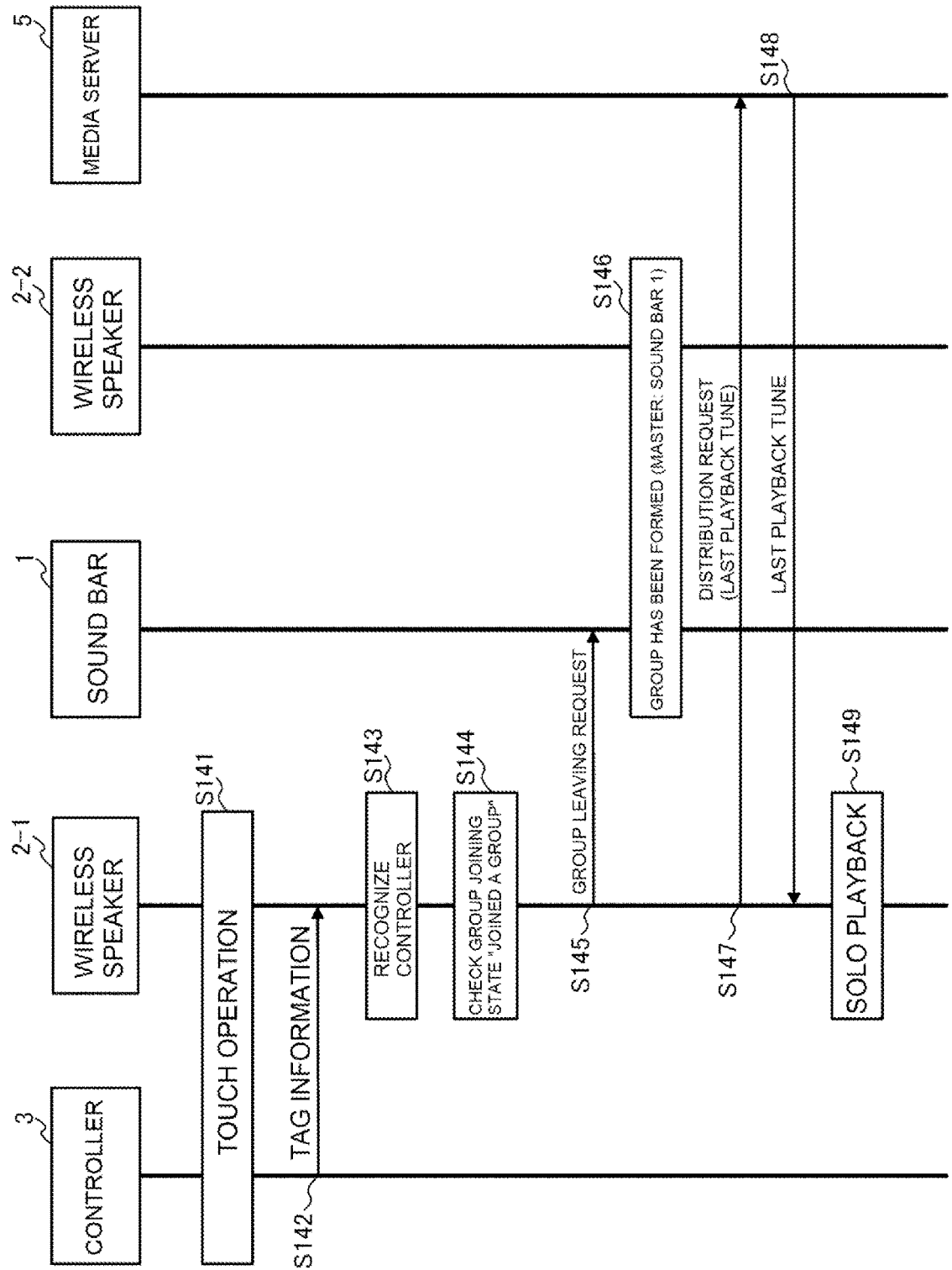
FIG. 5 is a sequence diagram for illustrating the group joining and leaving processing by the wireless speakers (2) in the speaker system according to this embodiment, and is a continuation of FIG. 4.

FIG. 4 and FIG. 5 are sequence diagrams for illustrating group joining and leaving processing by the wireless speakers 2 in the speaker system according to this embodiment.

It is assumed that a group having the sound bar 1 as a master and having the wireless speaker 2-2 as a slave has been formed (Step S130). The user performs touch operation in which another wireless speaker 2-1 is touched with the controller 3 (Step S131). This brings the RFID tag 30 of the controller 3 into a communication range of the RFID tag reader 20 of the wireless speaker 2-1, and the RFID tag reader 20 of the wireless speaker 2-1 reads the tag information out of the RFID tag 30 of the controller 3 (Step S132).

The wireless speaker 2-1 recognizes the fact that the touch operation has been performed with the controller 3, based on the controller ID that is included in the tag information read by the RFID tag reader 20 (Step S133), and then checks the group joining state "left a group" of the wireless speaker 2-1 itself (Step S134). In this case, the wireless speaker 2-1 transmits, by short-range wireless communication, a group joining request to the sound bar 1 functioning as the master of the group (Step S135). A group having the sound bar 1 as a master and having the wireless speakers 2-1 and 2-2 as slaves is thus formed (Step S136).

The wireless speaker 2-1 next transmits, to the sound bar 1 that is the master of the group, a playback request accompanied by specification of the last playback tune of the wireless speaker 2-1 itself (Step S137). The sound bar 1 receiving the request transmits a distribution request accompanied by the specification of the last playback tune to the media server 5 via the access point 6 and the network 7 (Step S138), and acquires the last playback tune from the media server 5 (Step S139). The sound bar 1 then plays back the acquired last playback tune by group playback (Step S140). That is, at the same time as playing back the last playback tune and outputting the played back tune from the speakers of the plurality of channels included in the sound bar 1 itself, the sound bar 1 transmits reproduced data of this last playback tune to the wireless speakers 2-1 and 2-2 by short-range wireless communication and has the wireless speakers 2-1 and 2-2 output the reproduced data.

After the last playback tune finishes being played back and some time passes, the user again performs touch operation in which the wireless speaker 2-1 is touched with the controller 3 (Step S141). This brings the RFID tag 30 of the controller 3 into the communication range of the RFID tag reader 20 of the wireless speaker 2-1, and the RFID tag reader 20 of the wireless speaker 2-1 reads the tag information out of the RFID tag 30 of the controller 3 (Step S142).

The wireless speaker 2-1 recognizes the fact that the touch operation has been performed with the controller 3, based on the controller ID that is included in the tag information read by the RFID tag reader 20 (Step S143), and then checks the group joining state "joined a group" of the wireless speaker 2-1 itself (Step S144). In this case, the wireless speaker 2-1 transmits a group leaving request to the sound bar 1 that is the master of the group to which the wireless speaker 2-1 itself has joined (Step S145), and leaves the group. This leaves the wireless speaker 2-2 as a sole participating member (slave) of the group having the sound bar 1 as the master (Step S146).

The wireless speaker 2-1 next transmits, to the media server 5 via the access point 6 and the network 7, a distribution request accompanied by specification of the last playback tune of the wireless speaker 2-1 itself (Step S147), and acquires the last playback tune from the media server 5 (Step S148). The wireless speaker 2-1 then plays back the acquired last playback tune by itself (Step S149).

Next, details of the sound bar 1 and the wireless speakers 2 which form the speaker system according to this embodiment are described. A detailed description on the controller 3 is omitted because an existing wireless terminal such as a smartphone or a tablet PC that has an RFID tag is usable as the controller 3.

Details of the sound bar 1 are described first.

Figure 6:
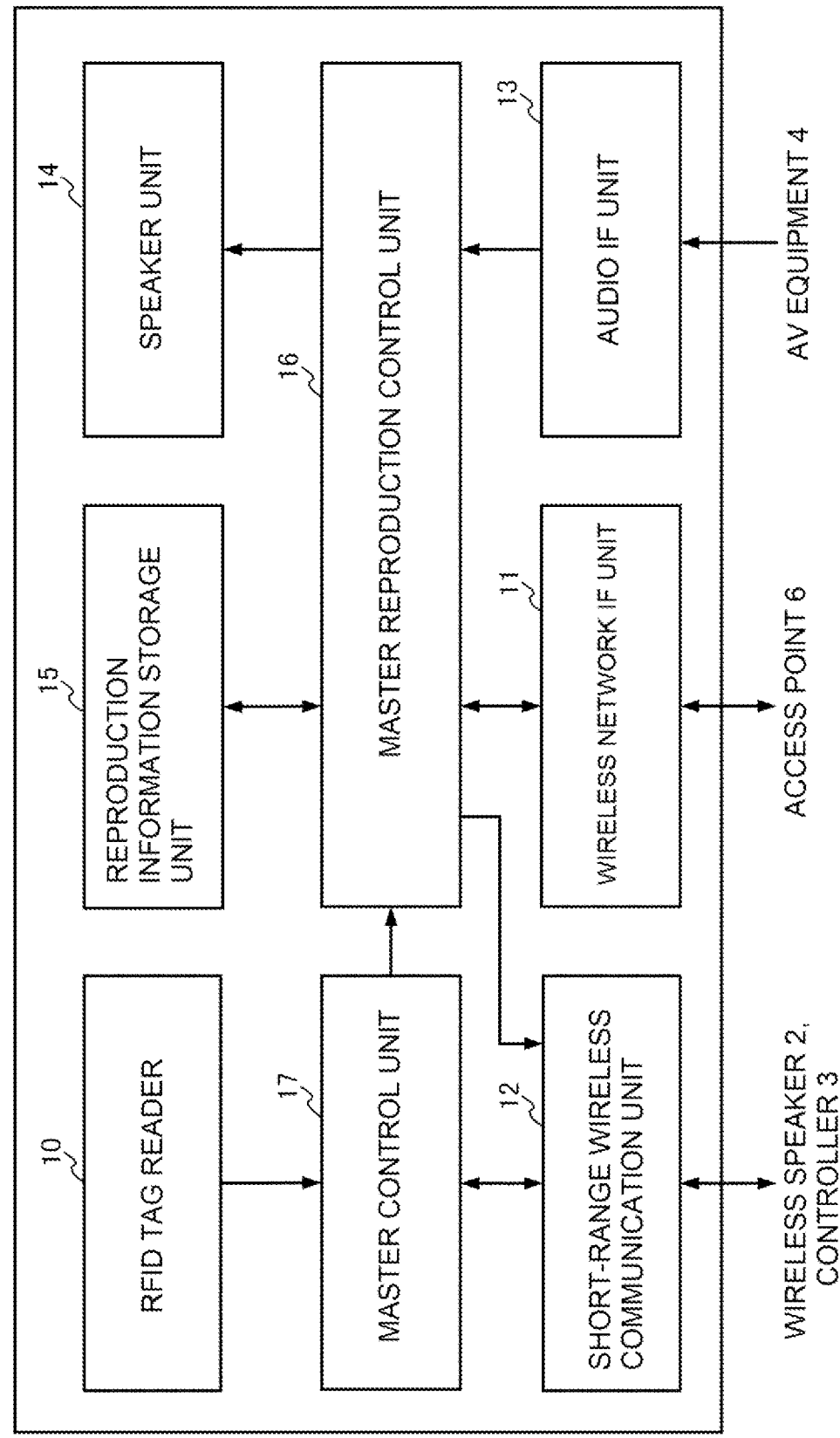
FIG. 6 is a schematic function configuration diagram of the sound bar (1).

FIG. 6 is a schematic function configuration diagram of the sound bar 1.

As illustrated in the figure, the sound bar 1 includes the RFID tag reader 10, a wireless network interface (IF) unit 11, a short-range wireless communication unit 12, an audio interface (IF) unit 13, a speaker unit 14, a reproduction information storage unit 15, a master reproduction control unit 16, and a master control unit 17.

The RFID tag reader 10 reads the tag information out of the RFID tag 30 of the controller 3 that has approached and reached inside the communication range.

The wireless network IF unit 11 is an interface for connecting to the network 7 via the access point 6.

The short-range wireless communication unit 12 is an interface for connecting to the wireless speakers 2 and the controller 3 by short-range wireless communication such as Bluetooth (trademark).

The audio IF unit 13 is an interface for receiving audio data from the AV equipment 4, and a communication interface such as a High-Definition Multimedia Interface (HDMI, trademark) or a Universal Serial Bus (USB) is used as the audio IF unit 13.

The speaker unit 14 includes the center channel speaker, the left channel speaker, and the right channel speaker.

The reproduction information storage unit 15 stores information on audio data reproduced last (the last playback tune) by its own sound bar 1.

The master reproduction control unit 16 controls reproduction of audio data depending on the group state of its own sound bar 1. Specifically, when the group state of its own sound bar 1 is "formed a group," the master reproduction control unit 16 performs control so that audio data to be reproduced is reproduced by group playback together with every one of the wireless speakers 2 that is a participating member of the group and, when the group state of its own sound bar 1 is "disbanded a group," the master reproduction control unit 16 performs control so that audio data to be reproduced is reproduced by its own sound bar 1 alone.

The master control unit 17 controls forming and disbanding of a group. Specifically, when the tag information read by the RFID tag reader 10 includes the controller ID of the controller 3 and the group state of its own sound bar 1 is "formed a group," the master control unit 17 transmits a group disbanding notification to each one of the wireless speakers 2 that is a participating member of the group, disbands the group, and stores information of each one of the wireless speakers 2 that has been a participating member of the disbanded group as the immediate last slave information. When the group state of its own sound bar 1 is "disbanded a group," on the other hand, the master control unit 17 transmits a group forming notification to each one of the wireless speakers 2 that is identified by the registered immediate last slave information, and forms a group having its own sound bar 1 as a master and having, as a slave, each one of the wireless speakers 2 that is identified by the immediate last slave information.

The function configuration of the sound bar 1 that is illustrated in FIG. 6 may be implemented in the form of hardware by an integrated logic IC such as an application-specific integrated circuit (ASIC) or a field-programmable gate array (FPGA), or may be implemented in the form of software by a computer such as a digital signal processor (DSP). The function configuration may also be implemented by a central processing unit (CPU) by loading a predetermined program out of an auxiliary storage device onto a memory and executing the program on a general-purpose computer such as a PC including the CPU, the memory, the auxiliary storage device, which is a flash memory, a hard disk drive, or the like, a wireless LAN adaptor, a short-range wireless communication device such as a Bluetooth (trademark) adapter, an RFID tag reader, and a plurality of speakers.

Figure 7:
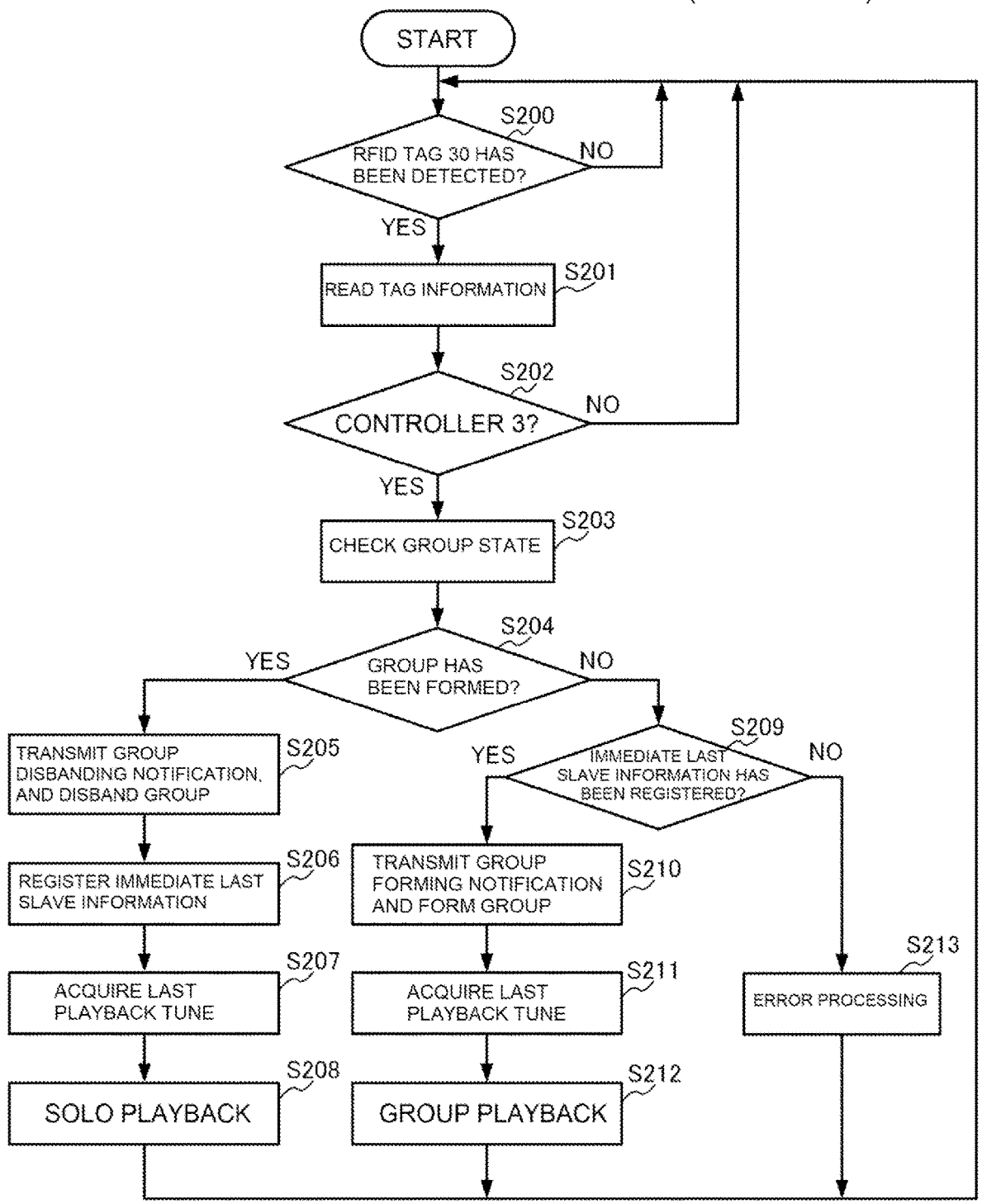
FIG. 7 is a flow chart for illustrating group forming and disbanding operation of the sound bar (1).

FIG. 7 is a flow chart for illustrating group forming and disbanding operation of the sound bar 1.

When detecting the RFID tag 30 that is located in the communication range ("YES" in Step S200), the RFID tag reader 10 reads the tag information out of this RFID tag 30 and hands the read tag information over to the master control unit 17 (Step S201). The master control unit 17 receiving the tag information checks whether the controller ID of the controller 3 is included in this tag information, to thereby determine whether this RFID tag 30 belongs to the controller 3 (Step S202). When it is determined that this RFID tag 30 belongs to the controller 3 ("YES" in Step S202), the master control unit 17 checks the group state of its own sound bar 1 (Step S203).

When the group state of its own sound bar 1 is "formed a group" ("YES" in Step S204), the master control unit 17 transmits, via the short-range wireless communication unit 12, a group disbanding notification to each one of the wireless speakers 2 that has joined, as a slave, the group having its own sound bar 1 as the master, and disbands the group (Step S205). The master control unit 17 then registers, as the immediate last slave information, information on each one of the wireless speakers 2 that has participated in the disbanded group as a slave (Step S206).

The master control unit 17 next gives the master reproduction control unit 16 an instruction telling that the last playback tune is to be played back by the sound bar 1 alone. The master reproduction control unit 16 receiving the instruction transmits, to the media server 5 via the wireless network IF unit 11, based on the information stored in the reproduction information storage unit 15, a distribution request accompanied by specification of last playback tune information, and acquires the last playback tune from the media server 5 (Step S207). The master reproduction control unit 16 then performs control so that the acquired last playback tune is played back by the sound bar 1 alone (Step S208). That is, the last playback tune is played back and output from the speaker unit 14.

When the group state of its own sound bar 1 is "disbanded a group" ("NO" in Step S204), on the other hand, the master control unit 17 checks the immediate last slave information and, in a case in which the immediate last slave information has been registered ("YES" in Step S209), transmits a group forming notification via the short-range wireless communication unit 12 to each one of the wireless speakers 2 that is identified by the immediate last slave information, and forms a group having its own sound bar 1 as a master and having, as a slave, each one of the wireless speakers 2 that is identified by the immediate last slave information (Step S210).

The master control unit 17 next gives the master reproduction control unit 16 an instruction telling that the last playback tune is to be played back by group playback. The master reproduction control unit 16 receiving the instruction transmits, to the media server 5 via the wireless network IF unit 11, based on the information stored in the reproduction information storage unit 15, a distribution request accompanied by specification of the last playback tune, and acquires the last playback tune from the media server 5 (Step S211). The master reproduction control unit 16 then performs control so that the acquired last playback tune is played back by group playback (Step S212). That is, at the same time as the last playback tune is played back and output from the speaker unit 14, the master reproduction control unit 16 uses the short-range wireless communication unit 12 to transmit reproduced data of this last playback tune to each one of the wireless speakers 2 that is a participating member of the group, and has the wireless speaker 2 output the reproduced data.

In a case in which the immediate last slave information has not been registered ("NO" in Step S209), on the other hand, the master control unit 17 executes predetermined error processing such as transmitting, to the controller 3 via the short-range wireless communication unit 12, a message recommending manual forming of a group because there is no past record of group forming.

Figure 8:
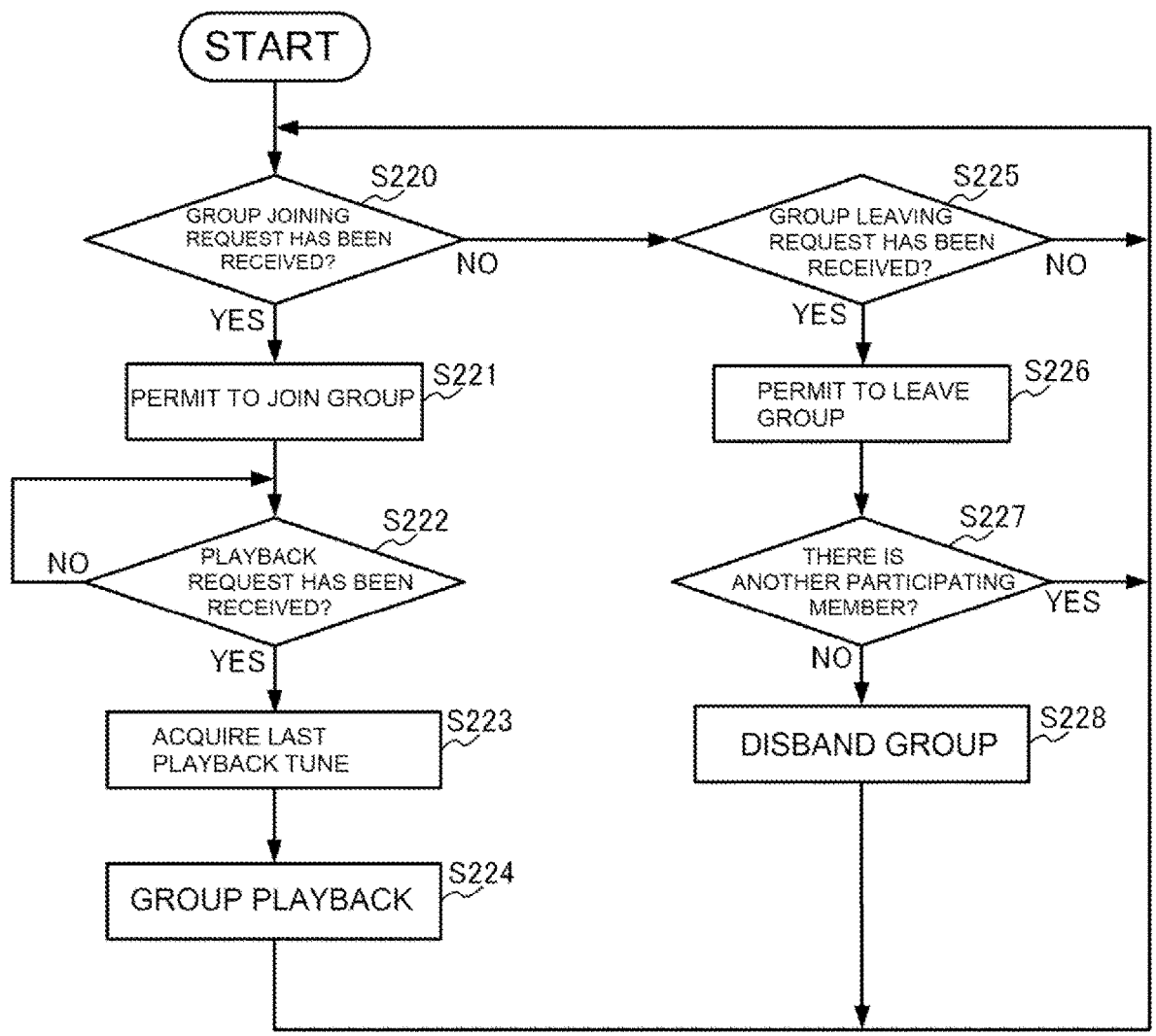
FIG. 8 is a flow chart for illustrating group joining and leaving reception operation of the sound bar (1).

FIG. 8 is a flow chart for illustrating group joining and leaving reception operation of the sound bar 1.

When receiving a group joining request from one of the wireless speakers 2 via the short-range wireless communication unit 12 ("YES" in Step S220), the master control unit 17 permits joining of the wireless speaker 2 to a group having its own sound bar 1 as the master (Step S221). At this point, in a case in which the group state of its own sound bar 1 is "disbanded a group," the master control unit 17 forms a group having its own sound bar 1 as a master, and then permits the wireless speaker 2 to join the group having its own sound bar 1 as the master.

When subsequently receiving a playback request accompanied by specification of the last playback tune from the wireless speaker 2 that has just joined the group, via the short-range wireless communication unit 12 ("YES" in Step S222), the master control unit 17 gives the master reproduction control unit 16 an instruction telling that the last playback tune is to be played back by group playback. The master reproduction control unit 16 receiving the instruction transmits a distribution request accompanied by specification of the last playback tune to the media server 5 via the wireless network IF unit 11, and acquires the last playback tune from the media server 5 (Step S223). The master reproduction control unit 16 then performs control so that the acquired last playback tune is played back by group playback (Step S224). That is, at the same time as the last playback tune is played back and output from the speaker unit 14, the master reproduction control unit 16 uses the short-range wireless communication unit 12 to transmit reproduced data of this last playback tune to each one of the wireless speakers 2 that is a participating member of the group, and has the wireless speaker 2 output the reproduced data.

Further, when receiving a group leaving request from one of the wireless speakers 2 via the short-range wireless communication unit 12 ("YES" in Step S225), the master control unit 17 permits leaving of the wireless speaker 2 from a group having its own sound bar 1 as the master (Step S226). At this point, in a case in which the group having its own sound bar 1 as the master has no other participating member ("NO" in Step S227), the master control unit 17 disbands the group having its own sound bar 1 as the master (Step S228).

Details of the wireless speakers 2 are described next.

Figure 9:
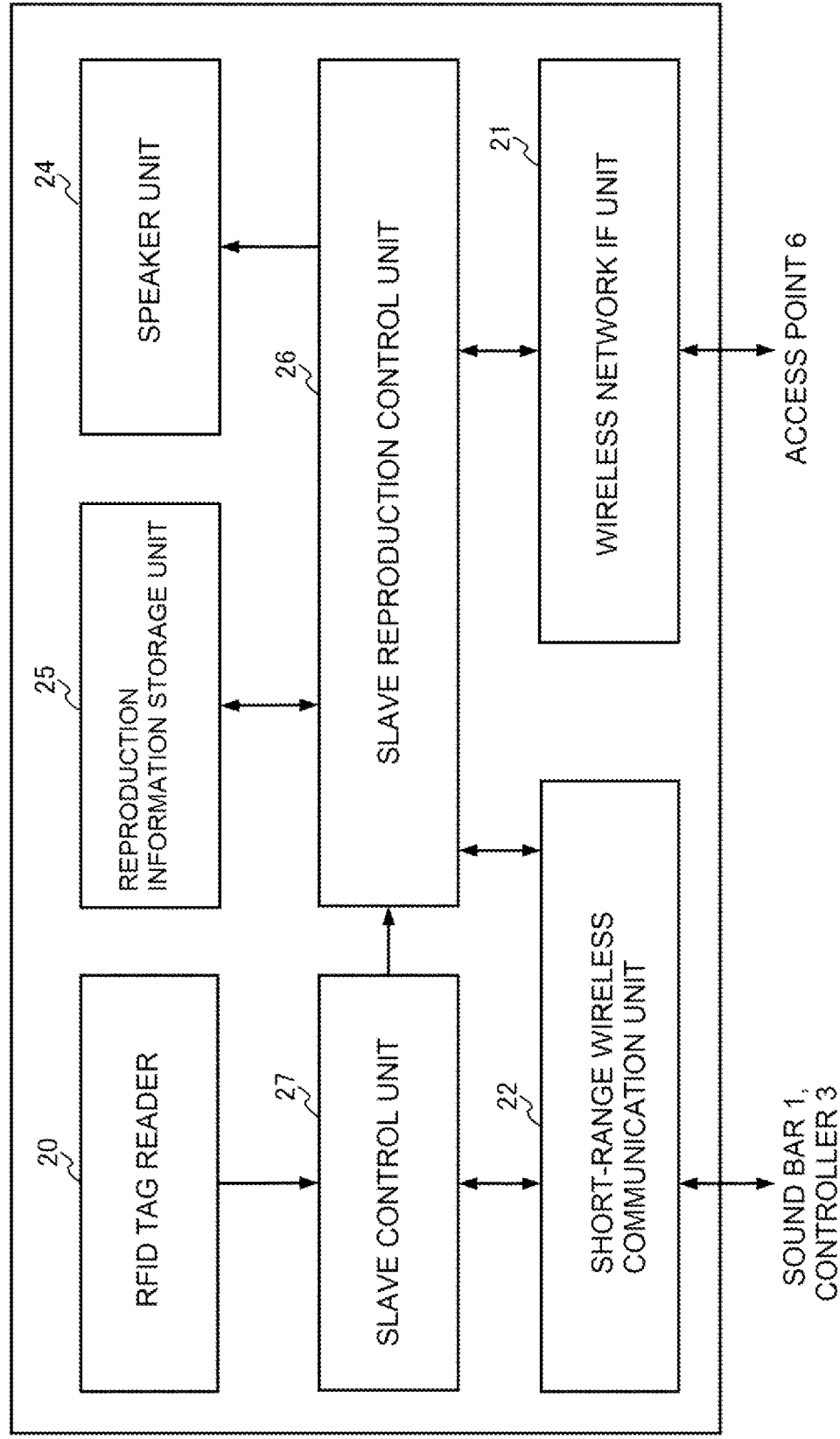
FIG. 9 is a schematic function configuration diagram of the wireless speakers (2).

FIG. 9 is a schematic function configuration diagram of the wireless speakers 2.

As illustrated in the figure, the wireless speakers 2 each include the RFID tag reader 20, a wireless network IF unit 21, a short-range wireless communication unit 22, a speaker unit 24, a reproduction information storage unit 25, a slave reproduction control unit 26, and a slave control unit 27.

The RFID tag reader 20 reads the tag information out of the RFID tag 30 of the controller 3 that has approached and reached inside the communication range.

The wireless network IF unit 21 is an interface for connecting to the network 7 via the access point 6.

The short-range wireless communication unit 22 is an interface for connecting to the sound bar 1 and the controller 3 by short-range wireless communication such as Bluetooth (trademark).

The speaker unit 24 includes at least one speaker.

The reproduction information storage unit 25 stores information on audio data (the last playback tune) that has been reproduced last by the one of the wireless speakers 2 to which the reproduction information storage unit 25 belongs.

The slave reproduction control unit 26 controls reproduction of audio data depending on a group joining state of the one of the wireless speakers 2 to which the slave reproduction control unit 26 belongs. Specifically, when the group joining state of the one of the wireless speakers 2 to which the slave reproduction control unit 26 belongs is "joined a group," the slave reproduction control unit 26 performs control so that audio data to be reproduced is reproduced by group playback together with other members of the group having the wireless speaker 2 as a member and, when the group joining state of the one of the wireless speakers 2 to which the slave reproduction control unit 26 belongs is "left a group," the slave reproduction control unit 26 performs control so that audio data to be reproduced is reproduced solely by the wireless speaker 2.

The slave control unit 27 controls joining to and leaving from a group. Specifically, when the tag information read by the RFID tag reader 20 includes the controller ID of the controller 3 and the group joining state of the one of the wireless speakers 2 to which the slave control unit 27 belongs is "joined a group," the slave control unit 27 transmits a group leaving request to the sound bar 1 that is the master of the group, leaves the group, and stores, as the immediate last master information, information on the sound bar 1 that is the master of the group which the slave control unit 27 has just left. When the group joining state of the one of the wireless speakers 2 to which the slave control unit 27 belongs is "left a group," on the other hand, the slave control unit 27 transmits a group joining request to the sound bar 1 that is identified by the registered immediate last master information, and joins the group having this sound bar 1 as the master.

As with the function configuration of the sound bar 1 illustrated in FIG. 6, the function configuration of the wireless speakers 2 that is illustrated in FIG. 9 may be implemented in the form of hardware by an integrated logic IC such as an ASIC or an FPGA, or may be implemented in the form of software by a computer such as a DSP. The function configuration may also be implemented by a CPU by loading a predetermined program out of an auxiliary storage device onto a memory and executing the program on a general-purpose computer such as a PC including the CPU, the memory, the auxiliary storage device, which is a flash memory, a hard disk drive, or the like, a wireless LAN adaptor, a short-range wireless communication device such as a Bluetooth (trademark) adapter, an RFID reader, and a plurality of speakers.

Figure 10:
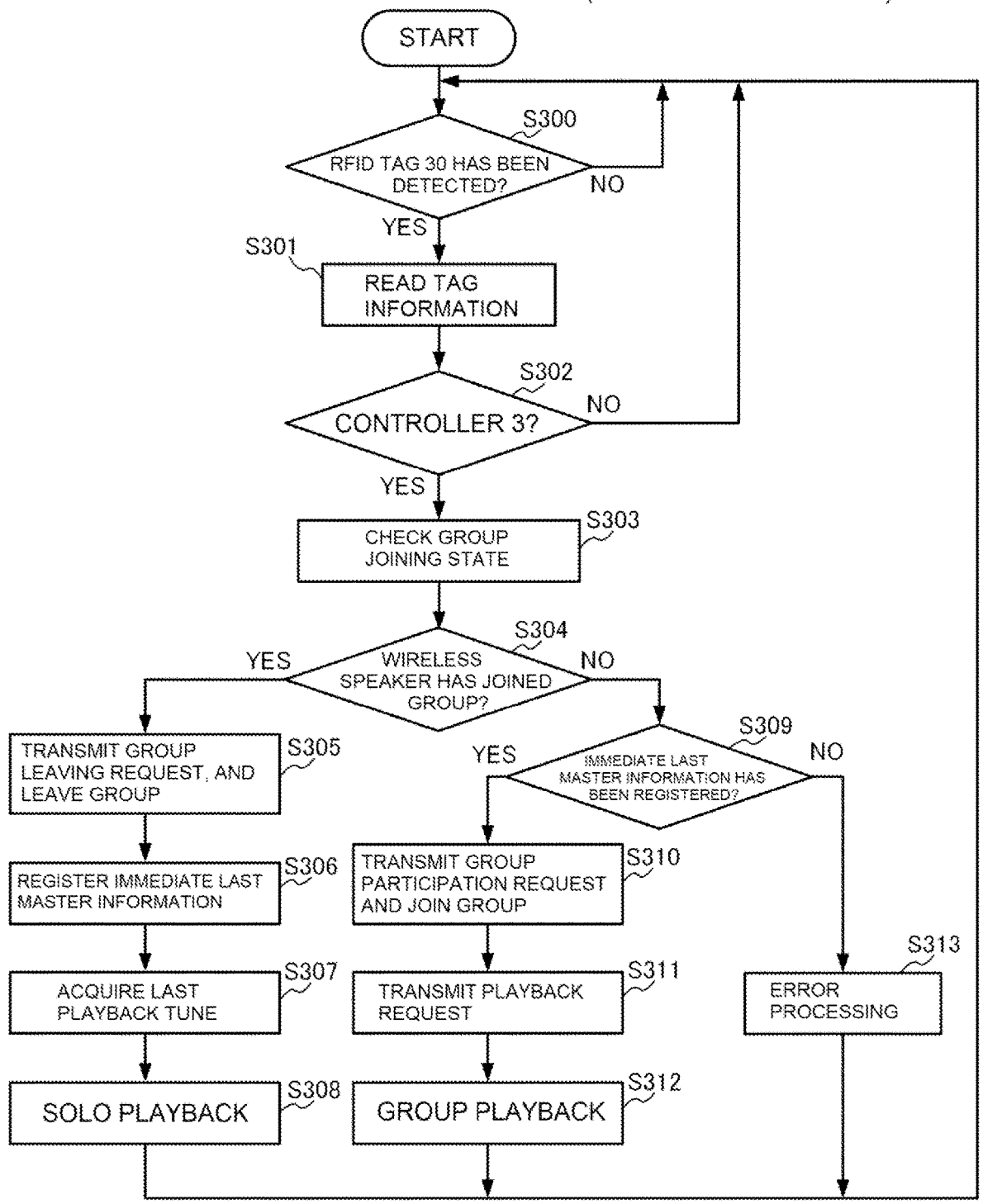
FIG. 10 is a flow chart for illustrating group joining and leaving operation of the wireless speakers (2).

FIG. 10 is a flow chart for illustrating group joining and leaving operation of the wireless speakers 2.

When detecting the RFID tag 30 that is located in the communication range ("YES" in Step S300), the RFID tag reader 20 reads the tag information out of this RFID tag 30 and hands the read tag information over to the slave control unit 27 (Step S301). The slave control unit 27 receiving the tag information checks whether the controller ID of the controller 3 is included in this tag information, to thereby determine whether this RFID tag 30 belongs to the controller 3 (Step S302). When it is determined that this RFID tag 30 belongs to the controller 3 ("YES" in Step S302), the slave control unit 27 checks the group joining state of the wireless speaker 2 to which the slave control unit 27 belongs (Step S303).

When the group joining state of the one of the wireless speakers 2 to which the slave control unit 27 belongs is "joined a group" ("YES" in Step S304), the slave control unit 27 transmits a group leaving request via the short-range wireless communication unit 22 to the sound bar 1 that is the master of the group which the wireless speaker 2 has joined, and leaves the group (Step S305). The slave control unit 27 then registers, as the immediate last master information, information on the sound bar 1 that is the master of the group which the slave control unit 27 has just left (Step S306).

The slave control unit 27 next gives the slave reproduction control unit 26 an instruction telling that the last playback tune is to be played back by the wireless speaker 2 alone. The slave reproduction control unit 26 receiving the instruction transmits, to the media server 5 via the wireless network IF unit 21, based on the information stored in the reproduction information storage unit 25, a distribution request accompanied by specification of last playback tune information, and acquires the last playback tune from the media server 5 (Step S307). The slave reproduction control unit 26 then performs control so that the acquired last playback tune is played back by the wireless speaker 2 alone (Step S308). That is, the last playback tune is played back and output from the speaker unit 24.

When the group joining state of the one of the wireless speakers 2 to which the slave control unit 27 belongs is "left a group" ("NO" in Step S304), on the other hand, the slave control unit 27 checks the immediate last master information and, in a case in which the immediate last master information has been registered ("YES" in Step S309), transmits a group joining request via the short-range wireless communication unit 22 to the sound bar 1 that is identified by the immediate last master information, and joins and participates in a group formed by this sound bar 1, as a slave (Step S310).

The slave control unit 27 next gives the slave reproduction control unit 26 an instruction telling that the last playback tune is to be played back by group playback. The slave reproduction control unit 26 receiving the instruction transmits, via the short-range wireless communication unit 22, to the sound bar 1 that is the master of the group in which the slave control unit 27 is participating, a playback request accompanied by specification of the last playback tune that is identified by the information stored in the reproduction information storage unit 25 (Step S311). The slave reproduction control unit 26 then receives reproduced data of the last playback tune via the short-range wireless communication unit 22 from the sound bar 1 that is the master of the group in which the slave control unit 27 is participating, and performs control so that the reproduced data is output from the speaker unit 24. Group playback of the last played tune by participating members of the group is thus executed (Step S312).

In a case in which the immediate last master information has not been registered ("NO" in Step S309), on the other hand, the slave control unit 27 executes predetermined error processing such as transmitting, to the controller 3 via the short-range wireless communication unit 22, a message recommending manual joining of a group because there is no past record of group joining.

Figure 11:
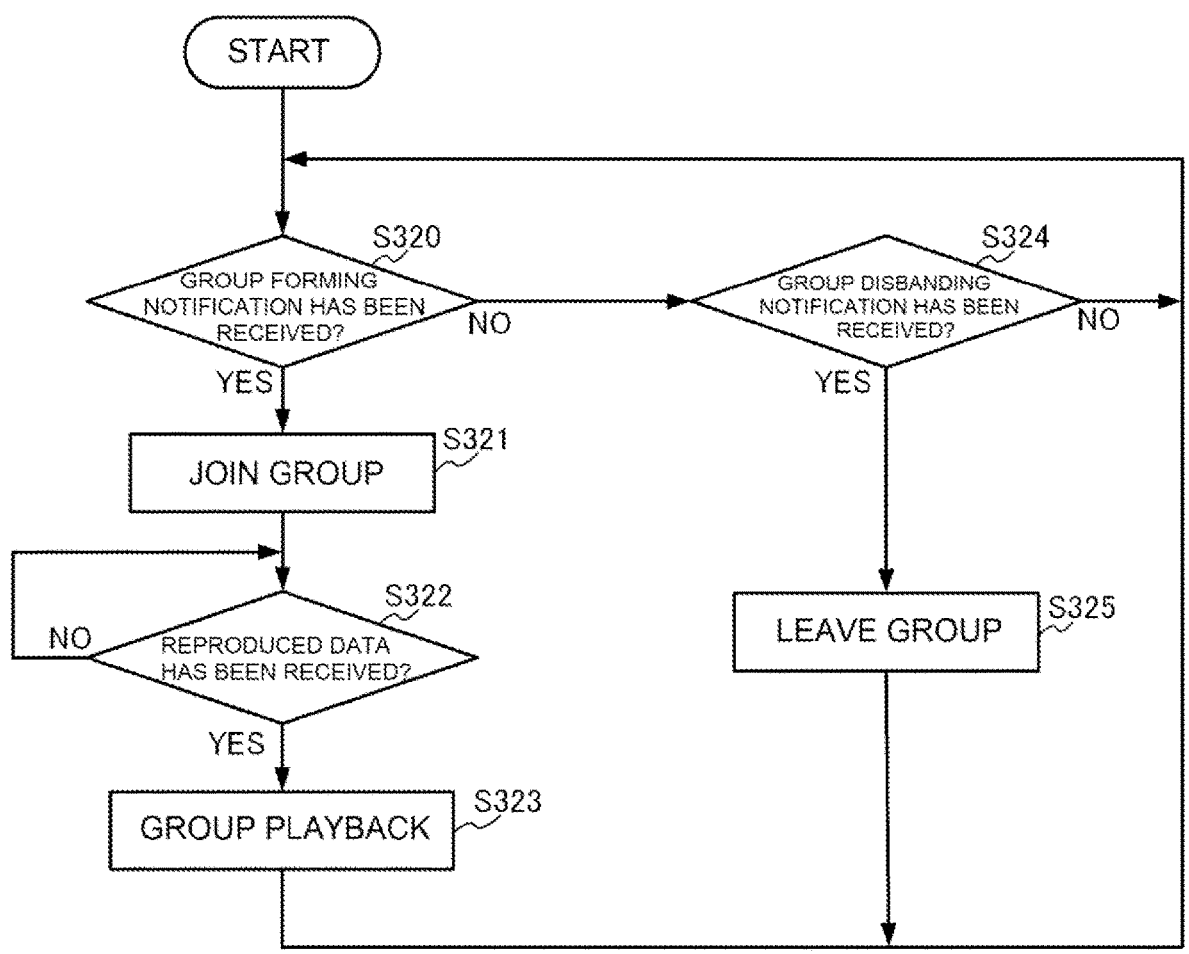
FIG. 11 is a flow chart for illustrating group forming and disbanding reception operation of the wireless speakers (2).

FIG. 11 is a flow chart for illustrating group forming and disbanding reception operation of the wireless speakers 2.

When receiving a group forming notification from the sound bar 1 via the short-range wireless communication unit 22 ("YES" in Step S320), the slave control unit 27 joins and participates in a group having this sound bar 1 as a master (Step S321). When subsequently receiving reproduced data of the last playback tune via the short-range wireless communication unit 22 from the sound bar 1 that is the master of the group in which the slave control unit 27 is participating ("YES" in Step S322), the slave reproduction control unit 26 performs control so that the reproduced data is output from the speaker unit 24. Group playback of the last played tune by participating members of the group is thus executed (Step S323).

When receiving a group disbanding notification from the sound bar 1 via the short-range wireless communication unit 22 ("YES" in Step S324), the slave control unit 27 leaves a group having this sound bar 1 as a master (Step S325).

The one embodiment of the present invention has been described above.

In this embodiment, with the user's operation of bringing the controller 3 close to the sound bar 1, a group having this sound bar 1 as a master and one of the wireless speakers 2 as a slave can be disbanded or formed. Further, with the user's operation of bringing the controller 3 close to the wireless speaker 2, this wireless speaker 2 can be removed from or added to a group having the sound bar 1 as a master. According to this embodiment, grouping of the sound bar 1 and the wireless speaker 2 and disbanding of the group are thus executable by simple operation.

In this embodiment, when the tag information read by the RFID tag reader 10 includes the controller ID of the controller 3, the sound bar 1 plays back the last playback tune by itself in a case of disbanding a group that has the sound bar 1 itself as a master, and plays back the last playback tune by group playback in a case of forming a group that has the sound bar 1 itself as a master. According to this embodiment, in addition to forming or disbanding of a group, group playback or solo playback of the last playback tune can thus be executed automatically by the user's operation of bringing the controller 3 close to the sound bar 1, and the user-friendliness is improved even more.

In this embodiment, when the tag information read by the RFID tag reader 20 of one of the wireless speakers 2 includes the controller ID of the controller 3, the wireless speaker 2 plays back the last playback tune by itself in a case of leaving a group and, in a case of joining a group, transmits a playback request of the last playback tune of the sound bar 1 that is the master of this group to play back the last playback tune together with the sound bar 1 and members of this group. According to this embodiment, in addition to group joining or group leaving, group playback or solo playback of the last playback tune can thus be executed automatically by the user's operation of bringing the controller 3 close to the wireless speaker 2, and the user-friendliness is improved even more.

The present invention is not limited to the embodiment described above, and various changes can be made without departing from the gist of the present invention.

For example, in the embodiment described above, the sound bar 1 automatically executes group playback or solo playback of the last playback tune that is a tune played back last by the sound bar 1 itself, in addition to forming or disbanding a group, upon the user's operation of bringing the controller 3 close to the sound bar 1. However, the present invention is not limited thereto. In place of the last playback tune, a desired tune registered in advance may be played back. Similarly, each one of the wireless speakers 2 automatically executes group playback or solo playback of the last playback tune that is a tune played back last by the wireless speaker 2, in addition to group joining or group leaving, upon the user's operation of bringing the controller 3 close to the wireless speaker 2. However, in place of the last playback tune, a desired tune registered in advance may be played back.

In this embodiment, when forming a group upon the user's operation of bringing the controller 3 close to the sound bar 1, the sound bar 1 automatically executes group playback of a tune subsequently to the forming of the group. However, the present invention is not limited thereto. In a case in which the sound bar 1 is set so as to give priority to solo playback, the sound bar 1 may play back a tune by itself instead of group playback. Similarly, when one of the wireless speakers 2 joins a group upon the user's operation of bringing the controller 3 close to the wireless speaker 2, the wireless speaker 2 automatically executes group playback of a tune subsequently to the group joining, but may play back a tune by itself instead of group playback in a case in which the wireless speaker 2 is set so as to give priority to solo playback.

In the embodiment described above, the sound bar 1 automatically executes group playback or solo playback of a tune subsequently to forming or disbanding of a group upon the user's operation of bringing the controller 3 close to the sound bar 1 itself. However, the sound bar 1 may choose to execute only forming or disbanding of a group without executing group playback or solo playback of a tune. Similarly, upon the user's operation of bringing the controller 3 close to one of the wireless speakers 2, the wireless speaker 2 automatically executes group playback or solo playback of a tune subsequent to group joining or group leaving, but may choose to execute only group joining or group leaving without executing group playback or solo playback of a tune.

The description given above on the embodiment takes, as an example, a case in which communication between the sound bar 1 and the controller 3 is short-range wireless communication such as Bluetooth (trademark). However, the present invention is not limited thereto. The sound bar 1 and the controller 3 may communicate with each other via the access point 6.

REFERENCE SIGNS LIST

1: sound bar, 2, 2-1 to 2-2: wireless speaker
3: controller, 4: AV equipment, 5: media server
6: access point, 7: network
10: RFID tag reader, 11: wireless network IF unit
12: short-range wireless communication unit, 13: audio IF unit
14: speaker unit, 15: reproduction information storage unit, 16: master reproduction control unit
17: master control unit, 20: RFID tag reader
21: wireless network IF unit, 22: short-range wireless communication unit
24: speaker unit, 25: reproduction information storage unit
26: slave reproduction control unit, 27: slave control unit

The invention claimed is:
1. A speaker system, comprising:
a sound bar having a group playback function as a master;
a wireless speaker having a group playback function as a slave; and
a controller,
wherein the controller includes a radio frequency identification (RFID) tag on which tag information including identification information of the controller is stored,
wherein the sound bar includes:
an RFID tag reader configured to read the tag information out of the RFID tag brought close so as to reach a communication range; and master control means configured to:
   transmit, in a case in which the tag information read by the RFID tag reader includes the identification information of the controller and the sound bar has formed a group, a group disbanding notification to the wireless speaker that is a slave belonging to the group, disband the group, and store information about the slave belonging to the group as immediate last slave information; and
   transmit, in a case in which the tag information read by the RFID tag reader includes the identification information of the controller and the sound bar has not formed a group, a group forming notification to the wireless speaker identified by the immediate last slave information, and form a group with the wireless speaker, and
wherein the wireless speaker includes slave control means configured to:
   leave a group which the wireless speaker has joined in a case in which the group disbanding notification is received from the sound bar that is a master of the group during a period in which the wireless speaker remains joined to the group; and
   join a group having the sound bar as a master in a case in which the group forming notification is received from the sound bar during a period in which the wireless speaker remains free of any group since leaving a group.

2. The speaker system according to claim 1, wherein the sound bar further includes:
reproduction information storage means configured to store information on audio data reproduced last; and
master reproduction control means configured to:
   reproduce, in a case in which the tag information read by the RFID tag reader includes the identification information of the controller and the master control means has disbanded a group having the sound bar as a master, audio data that is identified by the information stored in the reproduction information storage means by the sound bar alone; and
   reproduce, in a case in which the tag information read by the RFID tag reader includes the identification information of the controller and the master control means has formed a group having the sound bar as a master, audio data that is identified by the information stored in the reproduction information storage means by group playback together with members of the group.

3. A speaker system, comprising:
a sound bar having a group playback function as a master;
a wireless speaker having a group playback function as a slave; and
a controller,
wherein the controller includes a radio frequency identification (RFID) tag on which tag information including identification information of the controller is stored,
wherein the wireless speaker includes:
   an RFID tag reader configured to read the tag information out of the RFID tag brought close so as to reach a communication range; and
   slave control means configured to:
      transmit, in a case in which the tag information read by the RFID tag reader includes the identification information of the controller and the wireless speaker has joined a group, a group leaving request to the sound bar that is a master of the group, leave the group, and store information about the master of the group as immediate last master information; and
      transmit, in a case in which the tag information read by the RFID tag reader includes the identification information of the controller and the wireless speaker has left a group, a group joining request to the sound bar that is identified by the immediate last master information, and join a group having the sound bar as a master, and
wherein the sound bar includes master control means configured to:
   remove, when the group leaving request is received from the wireless speaker, the wireless speaker from a group having the sound bar as a master; and
   add, when the group joining request is received from the wireless speaker, the wireless speaker as a slave to a group having the sound bar as a master.

4. The speaker system according to claim 3, wherein the wireless speaker further includes:
reproduction information storage means configured to store information on audio data reproduced last; and
slave reproduction control means configured to:
   reproduce, in a case in which the tag information read by the RFID tag reader includes the identification information of the controller and the slave control means has removed the wireless speaker from a group having the sound bar as a master, audio data that is identified by the information stored in the reproduction information storage means by the wireless speaker alone; and
   transmit, in a case in which the tag information read by the RFID tag reader includes the identification information of the controller and the slave control means has added the wireless speaker to a group having the sound bar as a master, a playback request for reproducing audio data that is identified by the information stored in the reproduction information storage means to the sound bar, and reproduce the audio data by group playback together with the master and members of the group.

5. A sound bar having a group playback function as a master, the sound bar comprising:
a radio frequency identification (RFID) tag reader configured to read tag information out of an RFID tag brought close so as to reach a communication range; and
master control means configured to:
   transmit, in a case in which the tag information read by the RFID tag reader includes identification information of a controller and the sound bar has formed a group, a group disbanding notification to a wireless speaker that is a slave belonging to the group, disband the group, and store information about the slave of the group as immediate last slave information; and
   transmit, in a case in which the tag information read by the RFID tag reader includes identification information of a controller and the sound bar has not formed a group, a group forming notification to the wireless speaker identified by the immediate last slave information, and form a group with the wireless speaker.

6. A wireless speaker having a group playback function as a slave, the wireless speaker comprising:

a radio frequency identification (RFID) tag reader configured to read tag information out of an RFID tag brought close so as to reach a communication range; and slave control means configured to:
- transmit, in a case in which the tag information read by the RFID tag reader includes identification information of a controller and the wireless speaker has joined a group, a group leaving request to a sound bar that is a master of the group, leave the group, and store information about the master of the group as immediate last master information; and
- transmit, in a case in which the tag information read by the RFID tag reader includes identification information of a controller and the wireless speaker has left a group, a group joining request to a sound bar that is identified by the immediate last master information, and join a group having the sound bar as a master.

7. A method of controlling a speaker system including: a sound bar having a group playback function as a master; a wireless speaker having a group playback function as a slave; and a controller, the controller including a radio frequency identification (RFID) tag on which tag information including identification information of the controller is stored, the sound bar including an RFID tag reader configured to read the tag information out of the RFID tag brought close so as to reach a communication range, the method comprising:
- determining, by the sound bar, when the RFID tag reader reads the tag information out of the RFID tag, whether the tag information includes the identification information of the controller;
- transmitting, by the sound bar, in a case in which the tag information includes the identification information of the controller and the sound bar has formed a group, a group disbanding notification to the wireless speaker that is a slave belonging to the group, disbanding the group, and storing information about the slave of the group as immediate last slave information;
- transmitting, by the sound bar, in a case in which the tag information includes the identification information of the controller and the sound bar has not formed a group, a group forming notification to the wireless speaker identified by the immediate last slave information, and forming a group with the wireless speaker;
- leaving, by the wireless speaker, a group which the wireless speaker has joined in a case in which the group disbanding notification is received from the sound bar that is a master of the group during a period in which the wireless speaker remains joined to the group; and
- joining, by the wireless speaker, a group having the sound bar as a master in a case in which the group forming notification is received from the sound bar during a period in which the wireless speaker remains free of any group since leaving a group.

8. A method of controlling a speaker system including: a sound bar having a group playback function as a master; a wireless speaker having a group playback function as a slave; and a controller, the controller including a radio frequency identification (RFID) tag on which tag information including identification information of the controller is stored, the wireless speaker including an RFID tag reader configured to read the tag information out of the RFID tag brought close so as to reach a communication range, the method comprising:
- determining, by the wireless speaker, when the RFID tag reader reads the tag information out of the RFID tag, whether the tag information includes the identification information of the controller;
- transmitting, by the wireless speaker, in a case in which the tag information includes the identification information of the controller and the wireless speaker has joined a group, a group leaving request to the sound bar that is a master of the group, leaving the group, and storing information about the master of the group as immediate last master information;
- transmitting, by the wireless speaker, in a case in which the tag information includes the identification information of the controller and the wireless speaker has left a group, a group joining request to the sound bar that is identified by the immediate last master information, and joining a group having the sound bar as a master;
- removing, by the sound bar, when the group leaving request is received from the wireless speaker, the wireless speaker from a group having the sound bar as a master; and
- adding, by the sound bar, when the group joining request is received from the wireless speaker, the wireless speaker to a group having the sound bar as a master.

* * * * *